United States Patent [19]

Shults et al.

[11] 4,050,186
[45] Sept. 27, 1977

[54] SOUND PRODUCER

[76] Inventors: Otto C. Shults, 2107 Manchester Circle; Major L. Boddicker, 3836 S. Taft Road, both of Fort Collins, Colo. 80521

[21] Appl. No.: 710,608

[22] Filed: Aug. 2, 1976

[51] Int. Cl.$^2$ ............................................. A63H 5/00
[52] U.S. Cl. ....................................................... 46/180
[58] Field of Search ................................. 46/180, 187

[56] References Cited

U.S. PATENT DOCUMENTS

| 2,198,993 | 4/1940 | Felgner | 46/181 |
| 2,606,400 | 8/1952 | Olt et al. | 46/180 |
| 2,711,614 | 6/1955 | Halsten | 46/180 |
| 3,066,444 | 12/1962 | Dieckmann | 46/180 |

*Primary Examiner*—Louis G. Mancene
*Assistant Examiner*—Robert F. Cutting
*Attorney, Agent, or Firm*—Hugh H. Drake

[57] ABSTRACT

A sound producer, especially adapted to the calling of predators, is in the form of an elongated body of a size and shape to be grasped and held in the human hand. One portion of the body constitutes a barrel open at one end for the outlet of sound and including a bore that extends from that one end to a transverse wall. Another portion of the body projects from the wall away from the barrel and constitutes an exposed mouthpiece that has a working surface of widthwise flat configuration but curving outwardly in a direction away from the wall. A groove runs lengthwise centrally of the mouthpiece and opens into the bore. An elongated and planar reed is secured at one end in the wall in a position to overlie and cover the groove when pressed thereupon by the lips of the user encircling the reed and the mouthpiece.

9 Claims, 9 Drawing Figures

Fig.-1

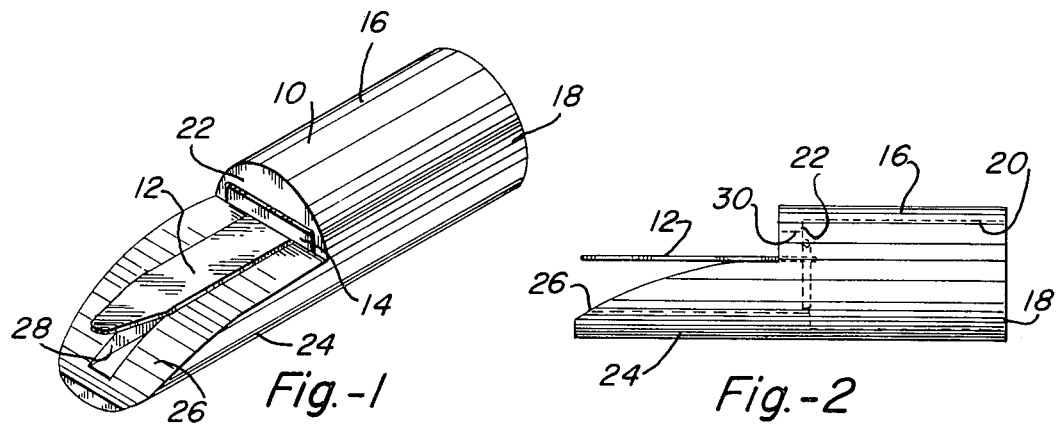
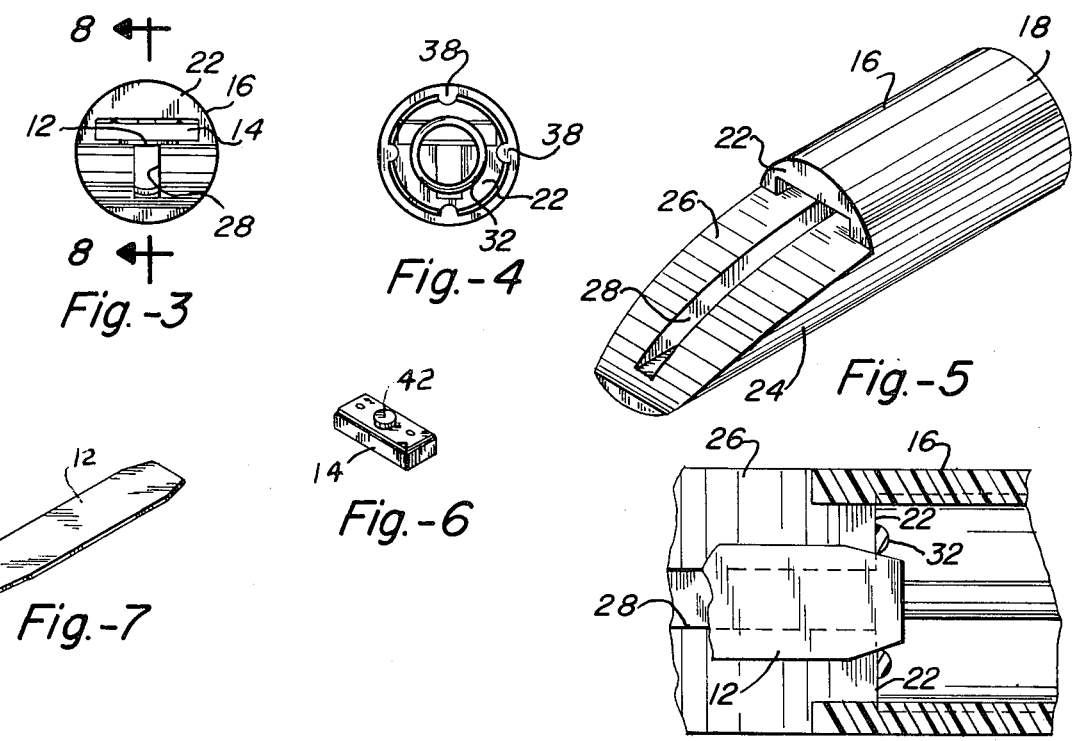
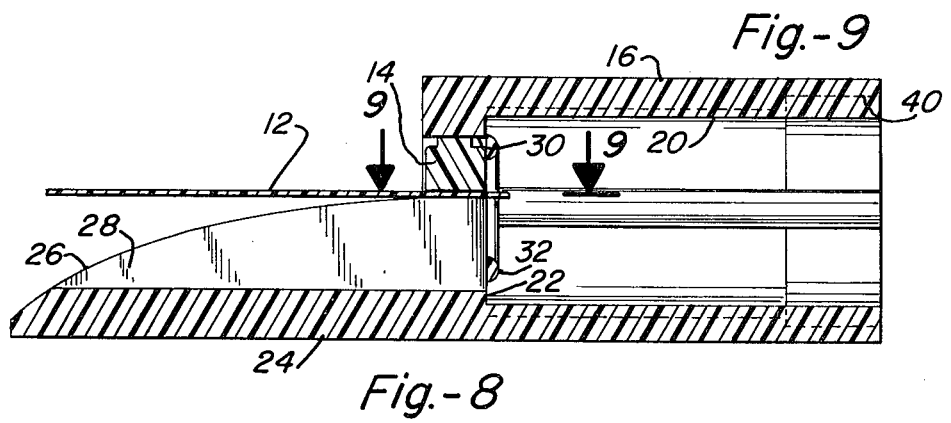

SOUND PRODUCER

The present invention pertains to a sound producer. More particularly, it relates to a hand held mouth-blown device for use in calling predators and the like.

For many years, wind-operated animal calls have been devised for the purpose of enabling the user to make an audible sound that served to attract one or more desired species. Perhaps most familiar are the so-called duck calls the goose calls. These seek to enable the user to immitate the natural call of the duck or goose in a manner to enable the wild quarry to be brought within range for hunting or photography. Another version of wild animal call seeks to simulate the sound of an animal in distress. This is particularly the case when it is desired to attract predators such as coyotes, bobcats or wild dogs. Frequently, the attempt is to reproduce the screaming sound made by a rabbit in mortal fear when under attack. Apparently, the predator or the like perceives that an edible morsel might have just been made available.

Many such calls are what might be termed a wind instrument. That is, the user engages his mouth with some type of mouthpiece and blows through the device. Within the device often is a vibrating reed which responds to the wind force by setting up the sound. the sound vibrations created by the reed are then usually accumlated in an outlet chamber before emerging from the device. This is not unlike the basic mechanism involved in a musical wind instrument.

A rather prevalent type of animal call involves use of a circular mouthpiece having a central opening. The user places his lips against the mouthpiece and blows through the opening. A reed is located internally of the device so as to be placed into vibration by the force of the blown air and thus caused to create the sound. In that approach, the mouth of the user does not actually come into contact with the reed. All control of the sound production must be by user adjustment of the input wind velocity, modulation thereof by lip movement and action upon the output sound waves by use of a hand curled around the outlet.

Calls of the kind under discussion often are used in inclement weather. Freezing temperatures and high-moisture conditions are not uncommon. In other situations, such devices are subjected to extremes of dust and grime. Under any of these conditions, faulty operation of the vibrating reed is likely to occur by reason of the internal buildup of foreign substance. In such cases, it may become necessary to dismantle the unit in order to effect a sufficient cleaning and/or drying procedure so as to restore it to effectiveness. With numbed fingers in a freezing environment, for example, that can become an at least almost impossible task. In any event, it may constitute undersirable delay.

One way of combatting the problem of such malfunctions of an internally-located vibrating reed is to move the location of the reed to an external location on a frontal mouthpiece. In a sense, the reed thus becomes positioned more like that in a wind-type musical instrument such as a clarinet or saxaphone. Since the environment is so changed, however, from that normally experienced in the use of such musical instruments, different considerations in reed conformation and structure are necessitated. Moreover, the different nature of the desired sounds calls for somewhat of a change in approach. To that end, prior external reed systems have sought to employ a phenolic paper for the reed material. For adequate operation, however, such paper requires special tapering in thickness and is subject to cracking under adverse weather conditions. Moreover, prior systems of this general type have involved undue mechanical complexities of construction as well as limited life of the reeds employed and difficulty for the user in attaining proper operation under a variety of conditions.

It is, accordingly, a general object of the present invention to provide a new and improved type of sound producer that both incorporates the best features of that which has been hereinabove described while yet avoiding various difficulties attendant thereto.

Another object of the present invention is to provide a new and improved predator call which is inexpensive to produce and supply and yet which is capable of highly efficient and productive use in the field.

A sound producer in accordance with the present invention takes the form of an elongated body of a size and shape to be grasped and held by the human hand. One portion of the body constitutes a barrel open at one end to a transverse wall terminating the bore. Another portion of the body projects from the wall away from the barrel and consitutes an exposed mouthpiece that has a working surface of widthwise flat configuration but longitudinally grooved and curving outwardly in a direction away from the wall. An elongated and planar reed of laterally vibrant material is secured at one end in the wall in a position to overlie and substantially cover the groove when pressed thereupon by the lips of the user encircling the reed and the mouthpiece.

The features of the present invention which are believed to by novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

FIG. 1 is a perspective view of a sound producer;

FIG. 2 is a side elevational view of the device shown in FIG. 1;

FIG. 3 is a front elevational view thereof;

FIG. 4 is a rear elevational view thereof;

FIG. 5 is a perspective view similar to FIG. 1 but with two of the components removed;

FIG. 6 is a perspective view of one of the components that was removed in the showing of FIG. 5;

FIG. 7 is a perspective view of another of the components that was removed from the showing in FIG. 5;

FIG. 8 is a cross-sectional view taken along the line 8—8 in FIG. 3; and

FIG. 9 is a fragmentary cross-sectional view taken along the line 9—9 in FIG. 8.

While the device is in any case a sound producer as in a musical instrument, bird call or predator call, the focus herein is upon its use as a predator call and it will, therefore, be described in that context. As specifically embodied, the call is composed of just three separable parts. These are an elongated body 10, a reed 12 and a plug 14 that secures reed 12 to body 10. In general, body 10 is of a size and shape to be grasped and held by the human hand. As shown, it is of general cylindricaL cross section, of a total length of about three inches and of a maximum external diameter of about ⅝ inch.

A forward portion of body 10 constitutes a barrel 16 open at one end 18 for the outlet of sound and including a bore 20 that extends from end 18 to a transverse wall 22 that terminates bore 20. Another portion of body 10 projects from wall 22 away from barrel 16 and constitutes an exposed mouthpiece 24. Mouthpiece 24 has a working surface 26 of widthwise flat configuration but which curves outwardly in a direction away from wall 22. In more particular, surface 26 projects away from wall 22 with a curvature, away from the longitudinal axis of body 10, which at least approximately is semi-parabolic. Otherwise, the general cross-section of all of body 10 is cylindrical. A groove or channel 28 is cut into and runs lengthwise centrally of mouthpiece 24 and opens into bore 20 through wall 22.

Elongated and planar reed 12 is formed of a laterally vibrant material which is of uniform thickness throughout its length and is made of a plastic which resembles Celluloid in physical characteristics. Reed 12 is secured at one end in wall 22 by plug 14 and in a position to overlie and substantially cover groove 28 when pressed thereupon by the lips of the user which encircle reed 12 and mouthpiece 24. Thus, wall 22 includes an opening 30 above but contiguous with surface 26 and groove 28. Opening 30 is sized and shaped to receive frictionally plug 14 so as to secure the latter within opening 30 and thereby also to secure the inner end of reed 12 in place so as to overlie groove 28.

In itself, reed 12 is laterally tapered inwardly toward its end that seats within recess 30 under plug 14, and wall 22 includes integrally formed means, in the form of a ring 32, that seats the inner end of reed 12 in operational relation with respect to groove 28. Ring 32 encompasses the portion of opening 30 into which reed 12 is inserted. At its outer end 36, reed 12 smoothly tapers to a rounded blunt end.

For the purpose of reinforcement, longitudinally extending ribs 38 spaced around the inner circumference of barrel 16 project a short distance radially inward from bore 20. In turn, bore 20 is outletted to an increased diameter as a 40. As an alternative, the sound outlet end of bore 20 may be flared into a bell shape.

An outwardly projecting nub 42 is in this case formed on the upper surface of plug 14. Nub 42 assists in the frictional engagement of the plug within the opening and yet facilitates its ready removability for purposes of reed placement.

In general as to use, varying the position of the lips upon reed 12 serves to vary the pitch, and variation in lip pressure also affects the pitch and quality of sound. Of course, the volume is a function of the quantity and pressure of supplied air. The formation of surface 26 to be widthwise flat enables reed 12 to fit tightly. At the same time, however, any accumulation of foreign matter, whether it be ice or grime, can be cleaned readily by a simple wiping action against a garment or the like. Should a reed be damaged, its replacement is readily enabled by the simple removal of plug 14. When freeze-failure of the unit should occur, it is only necessary to place the barrel end into the mouth, blow hard and then wipe the reed end.

The call is quite suitable for bringing within range such wildlife as coyote, fox, wolf, dog, bobcat, lion, badger, mink, martin, weasle, skunk, racoon, bear, javelina, crow, magpie, raven vulture, hawk, eagle, owl, woodpecker and chickadee. It may also be used to flush or stop deer, elk, prairie dog, woodchuck, marmot, squirrel, various game birds, rabbit and many other species. The device described will reach to a mile or more, depending on wind conditions. The operator may acquire a skill so as to produce a distressed animal call resembling anything from that of a mouse to a feral hog as well as bird sounds such as that from a flicker or a crow. It has been used successfully in temperature conditions ranging from a minus 44° F to 112° F.

The user places the mouthpiece in his mouth with the weed up, resting the mouthpiece itself on the lower teeth and lip and with the upper lip lightly touching the read about half-way back. The user then blows into the device, keeping his teeth apart. The initial sound resembles a squall. Taking short separate breaths and cupping one hand over the barrel outlet while moving the fingers of that hand so as alternately to cup and uncup it, a sound may be produced which is a series of undulating siren-type blasts. The pitch is raised by moving the call further out of the mouth and varying the pressure upon the reed. Various sounds may be produced, ranging from the high-pitched squeak of a mouse to the deep call of a distressed jack rabbit. Smooth variations in pressure and the distance of that pressure along the reed enable the production of a wailing-like sound. For certain, a degree of practice will be required for the user to gain maximum results.

While the various dimensions and proportions may be varied somewhat to suit a particular manufacturer's choices with regard to such parameters as tonal range and volume, FIG. 2 of the drawing as submitted is a direct tracing of the outline of a preferred embodiment. Thus, FIG. 2 also portrays the recommended curvature of surface 26. It will be observed that the maximum thickness of mouthpiece 24 is more than half the diameter of barrel 16. In this preferred embodiment, all three components are formed of plastic. Reed 12 is formed of a 0.010 inch thick polyester, having a length of 1 and 25/32 inches and a maximum width of 11/32 inch. Therefore, bore 20 has a cross-sectional area of the order of eleven times that of the maximum of the cross-sectional area of groove 28. Also, the length of bore 20 is approximately the same as the length of mouthpiece 24. Groove 28 is about ⅛ inch wide and has a maximum depth of 9/32 inch. Bore 20 has a width of 23/32 inch and a length of 1 and 9/32 inch. Plug 14 has dimensions of about 21/32 by 7/32 by 3/16 (including nub 42) inch.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A wildlife call comprising:
   an elongated body of a size and shape to be grasped and held by the human hand;
   one portion of said body constituting a barrel open at one end for the outlet of sound and including a bore extending from said one end to a transverse wall terminating said bore with said bore having a predetermined cross-sectional area;
   another portion of said body projecting from said wall away from said barrel and constituting a mouthpiece having a working surface exposed for insertion between the lips of the user and of widthwise flat configuration but curving outwardly in a direction away from said wall;
   a groove running lengthwise centrally of said mouthpiece and opening into said bore, said predetermined cross-sectional area of said bore being of the order of eleven times the maximum cross-sectional area of said groove;

and an elongated and planar reed, of laterally vibrant material, secured at one end in said wall in a position to overlie and substantially cover said groove when pressed thereupon by the lips of the user encircling said reed and said mouthpiece 2. A wildlife call as defined in claim 1 in which said one portion includes a plurality of circumferentially-spaced longitudinal ribs projecting into the bore of said barrel.

3. A wildlife call as defined in claim 1 in which said reed is formed of a plastic having a constant thickness.

4. A wildlife call as defined in claim 3 in which with width of said reed smoothly tapers to a rounded blunt end in a direction away from said wall.

5. A wildlife call comprising:

an elongated body of a size and shape to be grasped and held by the human hand;

one portion of said body constituting a barrel upon at one end for the outlet of sound and including a bore extending from said one end to a transverse wall terminating said bore;

another portion of said body projecting from said wall away from said barrel and constituting a mouthpiece having a working surface exposed for insertion between the lips of the user and of widthwise flat configuration but curving outwardly in a direction away from said wall, and the maximum thickness of said mouthpiece being more than one-half the diameter of said barrel;

a groove running lengthwise centrally of said mouthpiece and opening into said bore;

an elongated and planar reed, of laterally vibrant material, secured at one end in said wall in a position to overlie and substantially cover said groove when pressed thereupon by the lips of the user encircling said reed and said mouthpiece.

and the surface of said mouthpiece, into which said groove is formed and against which said reed is pressed, projecting away from said wall with a curvature, away from the longitudinal axis of said body, at least approximately semi-parabolic.

6. A wildlife call comprising:

an elongated body of a size and shape to be grasped and held by the human hand;

one portion of said body constituting a barrel open at one end for the outlet of sound and including a bore extending from said one end to a transverse wall terminating said bore;

another portion of said body projecting from said wall away from said barrel and constituting a mouthpiece having a working surface exposed for insertion between the lips of the user and of widthwise flat configuration but curving outwardly in a direction away from said wall;

a groove running lengthwise centrally of said mouthpiece and opening into said bore;

an elongated and planar reed, of laterally vibrant material, secured at one end of said wall in a position to overlie and substantially cover said groove when pressed thereupon by the lips of the user encircling said reed and said mouthpiece;

an opening defined in said wall above but contiguous with the surface of said mouthpiece into which said groove is formed;

and a rigid plug receivable within said opening to secure said one end of said reed in place and substantially close said opening.

7. A wildlife call as defined in claim 6 in which said plug includes a nub projecting outwardly against the wall of said opening and in alignment with said groove.

8. A wildlife call comprising:

an elongated body of a size and shape to be grasped and held by the human hand.

one portion of said body constituting a barrel open at one end for the outlet of sound and including a bore extending from said one end to a transverse wall terminating said bore;

another portion of said body projecting from said wall away from said barrel and constituting a mouthpiece having a working surface exposed for insertion between the lips of the user and of widthwise flat configuration but curving outwardly in a direction away from said wall;

a groove running lengthwise centrally of said mouthpiece and opening into said bore;

an elongated and planar reed, of laterally vibrant material, secured at one end in said wall in a position to overlie and substantially cover said groove when pressed thereupon by the lips of the user encircling said reed and said mouthpiece;

an opening included in said wall and above but contiguous with the surface of said mouthpiece into which said groove is formed;

a plug receivable within said opening to secure said one end of said reed in place;

and means included in said wall in association with said opening for centering and seating said one end of said reed in operational orientation with respect to said groove.

9. A wildlife call as defined in claim 8 in which said reed is tapered toward said one end and in which said seating means includes a ring integrally formed with said one wall and encompassing the portion of said opening into which said one end of said reed is inserted.

* * * * *